June 13, 1950 S. C. FOURNET 2,511,465
TRIMMING GUIDE DEVICE FOR IMPRESSION TRAYS
Filed May 21, 1948 2 Sheets-Sheet 1

Sidney C. Fournet
INVENTOR.

BY *Clarence A. O'Brien*
*and Harvey B. Jacobson*
Attorneys

Sidney C. Fournet
INVENTOR.

Patented June 13, 1950

2,511,465

UNITED STATES PATENT OFFICE 2,511,465

TRIMMING GUIDE DEVICE FOR IMPRESSION TRAYS

Sidney C. Fournet, New Orleans, La.

Application May 21, 1948, Serial No. 28,320

4 Claims. (Cl. 33—174)

This invention relates to devices for use in marking, on plastic lower impression trays, guide lines to insure proper trimming of the trays at the external oblique ridge areas and at the heels thereof.

In accordance with a known dental technique used in making full dentures, a temporary lower impression tray, which is over-extended at the external oblique ridge areas and at the heels thereof, is made by taking an impression of the mandible in vulcanite or like plastic material placed in an over-extended metal impression tray. This plastic tray is then trimmed at said areas and at the heels to respectively conform with and be parallel to the outer surface of the external oblique ridges and so that the heels will pass comfortably under the buccal folds. In teaching this technique, I have found it difficult to instruct students as to the proper angle at which the trays should be trimmed at the external oblique ridge areas and as to the proper contour on which they should be trimmed at the heels. In order to overcome this difficulty, I have provided devices adapted to be placed in predetermined positions on the end portions of the tray and having edges to guide a marker for drawing trimming guide lines on the tray, whereby trimming at the wrong angle and on the wrong contour, with consequent ruining of trays, is prevented.

An important object of the present invention is to provide simple guide devices of the above kind which are easy to use and highly efficient in use.

The exact nature of the present invention will become apparent from the following description when considered in connection with the accompanying drawings, in which.

Figure 1:
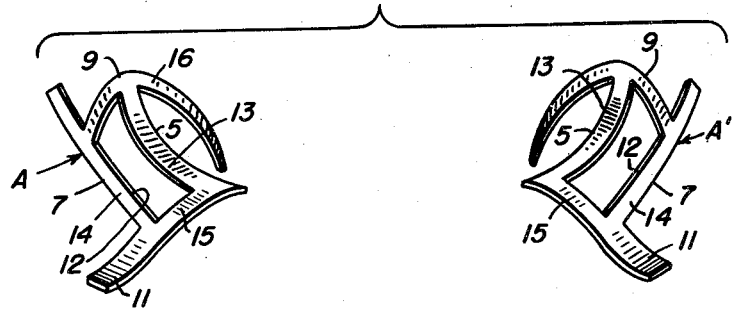
Figure 1 shows, in front perspective, a pair of guide devices embodying the present invention.
Figure 2:
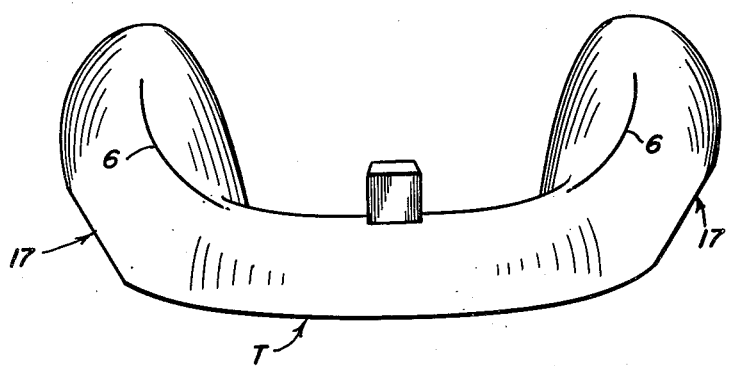
Figure 2 is a front elevational view of an over-extended plastic impression tray having center lines drawn thereon.

Referring in detail to the drawings, the present invention consists of a pair of members A and A' made of metal or any suitable material which is preferably malleable, said members being arched transversely to fit over the impression tray T, and each having an intermediate longitudinal positioning edge 5 adapted to be registered with a line 6 drawn in the center and on top of the end portion of the tray to correspond to the center of an edentulous alveolar ridge, an outer longitudinal or side edge 7 adapted to guide a marker in drawing a trimming guide line 8 on the tray parallel with the outer surface of the external oblique ridge, a convexed curved rear edge 9 adapted to guide the marker in drawing a transverse trimming guide line 10 on the tray of the proper curvature and in the proper position to insure correct trimming of the heel of the tray so that it will comfortably pass and fit under the buccal fold, and a laterally projecting handle-forming extension 11 on the outer side and front end of the member. By making the devices of malleable material, they may be readily bent to snugly fit over trays having end portions of different cross sectional contours and widths. As shown, each of the members has an opening 12 to define bar portions 13 and 14 having the edges 5 and 7, respectively, and a bar portion 15 connecting the front ends of the bar portions 13 and 14 and having the extension 11. Another bar portion 16 connects the rear ends of bar portions 13 and 14 and extends inwardly beyond the bar portion 13, while the bar portion 14 extends rearwardly beyond the bar portion 16.

The devices are similar except that one is of left-hand type and the other is of right-hand type for use on the corresponding ends of the tray.

Figure 5:
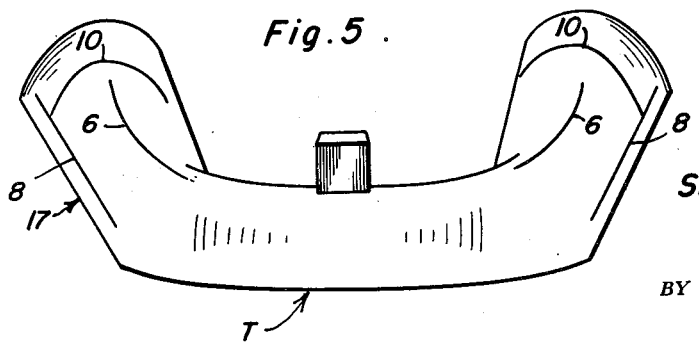
Figure 5 shows the tray in front elevation after being trimmed.
Figure 3:
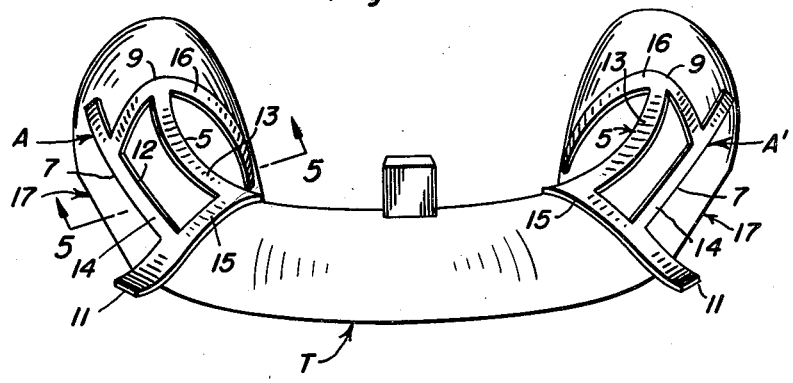
Figure 3 is a view similar to Figure 2 with the guide devices positioned thereon for use in drawing oblique ridge and heel guide lines on the same.
Figure 4:
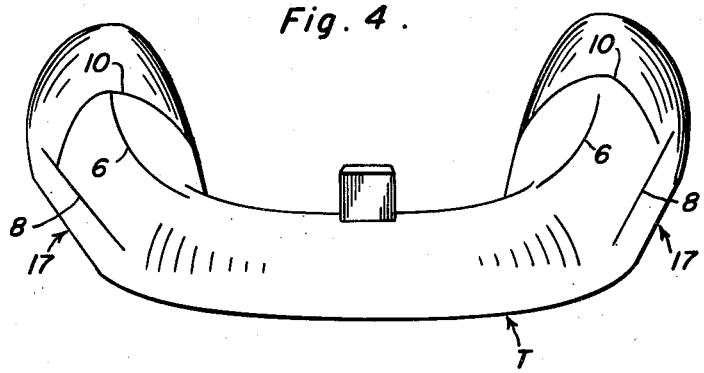
Figure 4 is a view similar to Figure 2 of a tray having a center line and oblique ridge and heel guide lines drawn thereon by use of the guide devices as shown in Figure 3.
Figure 6:
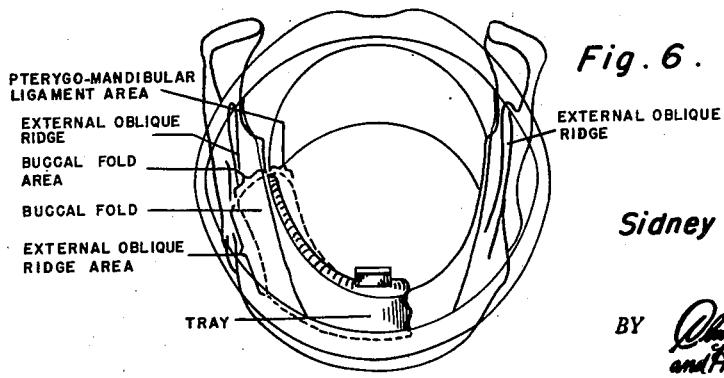
Figure 6 is a view showing the pathology of the mouth with a tray therein, legends being provided to aid an understanding of the nature and purpose of the present invention, and the tray being broken away.

In use, the center lines 6 are drawn on the tray as shown, whereupon the devices of Figure 1 are placed on the tray as shown in Figure 3 with the edges 5 thereof registered with the lines 6. The lines 8 and 10 are then drawn on the tray by means of a marker guided by the edges 7 and 9. By using the lines 8 and 10 as guides, the external oblique ridge areas 17 of the tray may be properly trimmed at the correct angle or parallel to the lines 8, and the heels of the tray may be trimmed in the proper direction and on the proper contour parallel with the lines 10. It may not be necessary to trim the tray entirely up to the lines 8 and 10, and this is clearly illustrated with respect to a trimmed tray in Figure 5.

From the foregoing description, it is believed that the construction, manner of use and advantages of the present invention will be readily understood and appreciated by those skilled in the art.

Having described the invention, what is claimed as new is:

1. A trimming guide device for plastic lower dental impression trays, comprising a transversely arched member adapted to fit over an end portion of the tray and having an intermediate longitudinal positioning edge, an outer side longitudinal marker guiding edge, and a convex curved transverse rear marker guiding edge, said marker guiding edges being arranged for guiding a marker in drawing trimming guide lines on the end portion of the tray for the external oblique ridge area and heel thereof.

2. The construction defined in claim 1, in combination with a handle forming extension projecting laterally from the outer side and front end of said member.

3. The construction defined in claim 1, wherein said member comprises two longitudinal bar portions and a transverse bar portion connecting said longitudinal bar portions, said bar portions having the edges for guiding a marker and the intermediate edge to facilitate location of the member on the tray with respect to a center line drawn thereon.

4. The construction defined in claim 1, wherein said member comprises two longitudinal bar portions and a transverse bar portion connecting said longitudinal bar portions, said bar portions having the edges for guiding a marker and the intermediate edge to facilitate location of the member on the tray with respect to a center line drawn thereon, the outer side bar portion of the member projecting rearwardly beyond the transverse bar portion.

SIDNEY C. FOURNET.

REFERENCES CITED

The following references are of record in the file of this patent:

UNITED STATES PATENTS

| Number | Name | Date |
|---|---|---|
| 724,185 | Hughes | Mar. 31, 1903 |
| 904,003 | Naldrett | Nov. 17, 1908 |
| 1,355,038 | Ford | Oct. 5, 1920 |
| 1,812,425 | Wosse | June 30, 1931 |
| 1,915,924 | Coe | June 27, 1933 |
| 2,262,977 | Vasil | Nov. 18, 1941 |
| 2,266,535 | Compan | Dec. 16, 1941 |